United States Patent
Small

(10) Patent No.: US 6,522,654 B1
(45) Date of Patent: Feb. 18, 2003

(54) METHOD FOR HOSTING THE INTERNET PROTOCOL SUITE ON THE IEEE-1394 HIGH SPEED SERIAL BUS

(75) Inventor: Donald E. Small, Merritt Island, FL (US)

(73) Assignee: Harris-Exigent, Inc., Melbourne, FL (US)

( * ) Notice: Subject to any disclaimer, the term of this patent is extended or adjusted under 35 U.S.C. 154(b) by 0 days.

(21) Appl. No.: 09/079,536

(22) Filed: May 15, 1998

(51) Int. Cl.$^7$ .............................. H04L 12/28; H04J 3/24
(52) U.S. Cl. ....................... 370/400; 370/252; 370/254; 370/473; 709/221; 709/245
(58) Field of Search .................. 370/400–408, 370/389–393, 252–253, 254, 473, 395.54; 709/220–224, 245–253, 230, 236

(56) References Cited

U.S. PATENT DOCUMENTS

| | | | | |
|---|---|---|---|---|
| 5,526,489 A | * | 6/1996 | Nilkantan | 395/200.02 |
| 5,764,930 A | * | 6/1998 | Staats | 395/287 |
| 5,978,854 A | * | 11/1999 | Fujimori | 709/245 |
| 6,219,697 B1 | * | 4/2001 | Lawande | 709/221 |

OTHER PUBLICATIONS

IEEE Standard 1394, 1995, pp. 299–308.
"IEEE 1394: A Ubiquitous Bus" Hoffman et al., conference paper at Compcon '95 in San Francisco, CA on March 5 to 9, 1995.
"IEEE 1394: The Cable Connection to Complete the Digital Revolution", Moore et al., VXM Technologies, Inc., Feb. 15, 1996.
"Fire on the Wire: The IEEE 1394 High Performance Serial Bus", Jennings et al., Adaptec, Inc., 1995.

* cited by examiner

Primary Examiner—Steven Nguyen
(74) Attorney, Agent, or Firm—Akerman Senterfitt

(57) ABSTRACT

A method and interface system for hosting a logical address based network protocol suite on a high speed serial bus network which has operatively connected thereto a plurality of network devices, each defining a node with a dynamically variable physical address. The system includes a software interface for monitoring the network to identify the occurrence of a bus reset event which has the potential to change a physical address assigned to the nodes; for receiving an updated physical address provided by the network devices as a result of the bus reset event; computer memory for storing therein an updated physical address together with a corresponding device logical address in an address resolution table. The address resolution table provides a mapping between the physical address and the logical address assigned to each of the devices on the network. The interface accesses the address resolution table upon receipt of a data packet to be transmitted to determine an updated physical address for one of the devices based upon its logical address.

29 Claims, 12 Drawing Sheets

| PHYSICAL ADDRESS | LOGICAL ADDRESS |
|---|---|
| PHYSICAL ID 2 | LOGICAL ADDRESS FOR DEVICE "A" |
| PHYSICAL ID 4 | LOGICAL ADDRESS FOR DEVICE "B" |
| PHYSICAL ID 3 | LOGICAL ADDRESS FOR DEVICE "C" |
| PHYSICAL ID 1 | LOGICAL ADDRESS FOR DEVICE "D" |
| PHYSICAL ID 6 | LOGICAL ADDRESS FOR DEVICE "E" |
| PHYSICAL ID 0 | LOGICAL ADDRESS FOR DEVICE "F" |
| PHYSICAL ID 5 | LOGICAL ADDRESS FOR DEVICE "G" |

| PHYSICAL ADDRESS | LOGICAL ADDRESS |
| --- | --- |
| PHYSICAL ID 2 | LOGICAL ADDRESS FOR DEVICE "A" |
| PHYSICAL ID 4 | LOGICAL ADDRESS FOR DEVICE "B" |
| PHYSICAL ID 3 | LOGICAL ADDRESS FOR DEVICE "C" |
| PHYSICAL ID 1 | LOGICAL ADDRESS FOR DEVICE "D" |
| PHYSICAL ID 6 | LOGICAL ADDRESS FOR DEVICE "E" |
| PHYSICAL ID 0 | LOGICAL ADDRESS FOR DEVICE "F" |
| PHYSICAL ID 5 | LOGICAL ADDRESS FOR DEVICE "G" |

FIG. 6A

METHOD FOR HOSTING THE INTERNET PROTOCOL SUITE ON THE IEEE-1394 HIGH SPEED SERIAL BUS

STATEMENT REGARDING FEDERALLY-SPONSORED RESEARCH OR DEVELOPMENT

This invention was made with government support under contracts N-00173-98-D-2007 and N-00014-95-C-2044, awarded by the Naval Research Laboratory, and the United States Government has certain rights in this invention.

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates generally to computer networks and more specifically to a method and apparatus for hosting a logical address based network protocol suite on a high speed serial bus network.

2. Description of the Related Art

It is commonly known that digital data may be communicated between various microprocessor controlled devices, including computers, by making use of certain types of networks. In this regard, there have been developed various network architectures and protocols to implement such systems in accordance with international standards. These protocols or standards ensure compatibility among various different kinds of computer controlled devices. In effect, the protocols provide a formal set of rules defining how to transmit data across the network and among the devices connected thereto.

Conventional network architectures typically are divided into a plurality of layers. For example, the opens systems interconnect or "OSI" Reference Model of network architecture establishes seven layers, comprising (from lowest to highest) a (1) physical layer, (2) datalink layer, (3) network layer, (4) transport layer, (5) session layer, (6) presentation layer and (7) application layer. Each layer in the hierarchy typically uses the function provided by the layer immediately below, and provides services to the layer above. One of the most commonly used network protocols is known as TCP/IP.

Transmission Control Protocol, or "TCP" as it is commonly called, is the most common type transport layer protocol. It provides flow control, multiplexing and connection oriented communication. TCP provides a point to point connection so that computer "A" can send messages to computer "B", and they will arrive un-corrupted and in correct order. The TCP layer also establishes and dissolves connections between devices on the network. TCP is designed to operate over a type of network layer known as Internet Protocol or "IP" and the two layers are almost always operated together in the combination commonly referred to as TCP/IP (TCP over IP). IP is a best effort packet switching protocol which controls packet routing, fragmentation and re-assembly through the data-link layer. The commonly used TCP/IP protocol suite is comprised of five layers. These include (from lowest to highest) the physical, data link, internet, transport and application.

One problem with computer networks, is that the bandwidth or speed at which data can be transmitted, is often limited. In recent years, however, a standard for a new type of high speed serial bus has been developed for transporting digital data. This high speed serial bus is known as IEEE 1394 (hereinafter "IEEE 1394"), which is a hardware and software standard for transporting data. IEEE 1394 devices are designed to have multiple connectors, allowing devices to be connected together in daisy chain and tree topologies. In addition to a cable specification, IEEE 1394 also defines a backplane specification, which supports devices in a multidrop bus environment.

The IEEE 1394 standard involves the lowest three of the ISO protocol layers described above. In the IEEE 1394 specification, these are referred to as the physical layer, the link layer and the transaction layer. In addition, a Serial Bus Management component is defined that provides the functions needed to control nodes or to manage bus resources. The upper two layers, namely the Link Layer and the Transaction Layer, connect to the application. The Link Layer provides packet receive and transmit capabilities for asynchronous and isochronous data transfers, whereas the Transaction Layer supports the asynchronous protocol Read, Write and Lock commands as discussed in below in greater detail. The lowest ISO layer, namely the Physical Layer, interfaces directly with the physical IEEE 1394 media and aids in bus initialization.

According to the IEEE 1394 standard, data is transferred between the various nodes on the serial bus by three different transaction types, namely the Read, Write and Lock commands as noted above. A Read transaction type permits data at a particular address within a responder to be transferred back to a requester. A Write transaction type permits data to be transferred from a requester to an address within one or more responders. A Lock transaction type permits data to be transferred from a requester to a responder, processed with data at a particular address within the responder, and then transferred back to the requester.

Due to the very common usage of TCP/IP network protocol within the computer industry, there are a great number of application programs and systems already in existence which are compatible with that standard. These are commonly referred to as the Internet Protocol suite. For example, the Internet Protocol suite includes a variety of application programs such as File Transfer Protocol ("FTP") for permitting a user of one computer to transfer files to and from another computer over a TCP/IP network; TELNET, the internet standard protocol for remote login which runs in a layer above TCP/IP; Network File System ("NFS") Client/Server, which allows a computer to access files over a network as if they were on its local disks; Remote Procedure Call ("RPC") which allows a program running on one host to cause code to be executed on another host; Remote Shell, BootP (used for booting diskless workstations), Sockets (for forming the interface between a Unix standard I/O and network communication facilities). Other such applications exist and are well known to those familiar with the field.

Significantly, with the recent development of the IEEE 1394 network standard, there has arisen a need to permit these existing software applications and systems comprising the IP protocol suite to communicate with one another using the new standard IEEE 1394 network. Likewise, there has also arisen a need to permit such applications and others to request and obtain access to bandwidth for isochronous data transfers on an IEEE 1394 type network. However, there are several serious obstacles which have prevented this type of IP suite—IEEE 1394 integration. Most significant, perhaps, is the dynamic nature of the addresses which are used in connection with the IEEE 1394 bus. In particular, the IEEE 1394 network specification provides that any time a node is added or removed from the system, either by physical connection/disconnection or power up/down, it triggers a bus reset event whereby new physical addresses may be assigned to each device on the network. A bus reset indication forces all nodes into a special state that clears all topology and address information, and causes the devices on the network to perform a procedure by which they are assigned new physical addresses. This is contrary to typical network devices and topology which assign fixed addresses.

The IP suite defines an Address Resolution Protocol ("ARP") entity which creates and automatically maintains physical to logical address mapping in memory in the form of an ARP table. Each network device will normally maintain its own ARP table. The ARP entity determines the physical (hardware) address of a computer's network interface by means of an ARP request, which is broadcast across the network. The request is an indication to the network device that is assigned a particular IP address to respond with its physical address. When the response is transmitted, it is loaded into the requesting network device's ARP table. ARP is a standard Internet protocol that is documented in RFC 826, which details how information should be exchanged between nodes and processed by nodes to support address translations. RFC 826 describes the possibility of nodes "moving" but does not present a solution to this problem, nor does it discuss the possibility of entire networks re-assigning physical addresses.

What makes this problem unique to IEEE-1394 networks is the dynamic nature of physical addressing of the IEEE-1394 protocol. As noted above, in the IEEE-1394 cable bus environment nodes can be added to and removed from an operational network independently. Each time this occurs the network re-evaluates the bus topology and re-assigns physical addresses to each node and therefore, any previously acquired Address Resolution information may be invalid.

Each time an IEEE 1394 bus goes through the process of physical address re-assignment, each node on the bus exchanges a "self id" packet with each other node. Each node collects these "self id" packets to form a "bus topology" map. As it turns out the resulting topology map is of little use in re-generating an existing ARP table because each "self id" packet contains only the sending node's new physical address, not its previous address.

SUMMARY OF THE INVENTION

A programmable computer interface method and system for hosting a logical address based network protocol suite on a high speed serial bus network which has operatively connected thereto a plurality of network devices, each defining a node with a dynamically variable physical address. The computer system means for storing in the devices a physical address together with a corresponding device logical address in an address resolution table, the address resolution table providing a mapping between the physical addresses and the logical addresses. Monitoring means are provided to monitoring the network to identify the occurrence of a bus reset event which has the potential to change a physical address assigned to the nodes. Further, means are provided for updating the address resolution table upon the occurrence of the bus reset event; and for accessing the address resolution table upon receipt of a data packet to be transmitted on the network to determine an updated physical address for a device on the network based upon the logical address. In a preferred embodiment, the utility for maintaining the address resolution table is an application comprising the logical address based network protocol suite.

In one embodiment, the utility for maintaining the address resolution table is part of the logical address based network protocol suite, and the logical address based network protocol suite is configured to operate with a conventional network wherein the physical addresses are comprised of additional bits as compared to the physical addresses of the high speed serial bus network. In that case, appropriate hardware and software is provided for forming a simulated address by appending least significant bits to the serial bus network physical address so that its total address length is equivalent to addresses used in the conventional network. The simulated address is then provided to the address resolution table.

Two alternative approaches are provided for updating the address resolution table. In one embodiment, the interface deletes existing data contained in the address resolution table and causes the address resolution table to regenerate itself using conventional means. Alternatively, updating the address resolution table can be performed by software provided for extracting from the address resolution table each the logical address contained therein; generating a broadcast network request for each the logical address, the network request containing the logical address; receiving a response from the device with a matching logical address which identifies a new physical address; and extracting from each response the new physical address and replacing each of the physical addresses with the new physical address corresponding to the logical address.

In those instances where the logical address based network protocol suite is configured to operate with a conventional network wherein the physical addresses are comprised of additional bits as compared to the physical addresses of the high speed serial bus network, the system further includes software for forming a simulated address by appending least significant bits to the serial bus network physical address so that its total address length is equivalent to addresses used in the conventional network and providing the simulated address to the address resolution table.

The invention further includes software for receiving a data packet from an application program executing on a first one of the devices configured with logical address based network protocol, the data packet addressed to a second one of the network devices; analyzing the data packet address to determine if the data packet is intended for an application associated with the logical address based network protocol suite; accessing the address resolution table to obtain the physical address for the second device based upon the logical address; assembling a frame header for the data packet, the frame header including an address field; inserting into the address field the physical address; and for transmitting the data via the network for receipt by the second device identified by the physical address. In the case where simulated physical addresses are used in which additional least significant bits have been added, the invention further includes software for stripping the least significant bits from the simulated physical address prior to inserting the physical address in the address field.

The programmable computer interface system is configured for receiving a data packet from the network, the data packet comprising a network information header containing a data packet address; for extracting from the data packet address a message type, the message type identifying a specific logical address based network protocol application for which the message is intended; for removing from the data packet the network information header; and for placing the data packet and the message type on the stack comprising the logical address based network protocol suite for further processing.

In one embodiment of the invention, the logical address based network protocol suite is an internet protocol suite and the high speed serial bus network is configured in accordance with the IEEE-1394 high speed serial bus standard. In that case, an indication of the bus reset event is generated by an occurrence of adding a node and removal of a node from the network.

BRIEF DESCRIPTION OF THE DRAWINGS

There are shown in the drawings embodiments which are presently preferred, it being understood, however, that the invention is not limited to the precise arrangements and instrumentalities shown, wherein:

FIG. 6(A) is an example of an address resolution table used in the present invention.

DETAILED DESCRIPTION OF THE INVENTION

Figure 1:
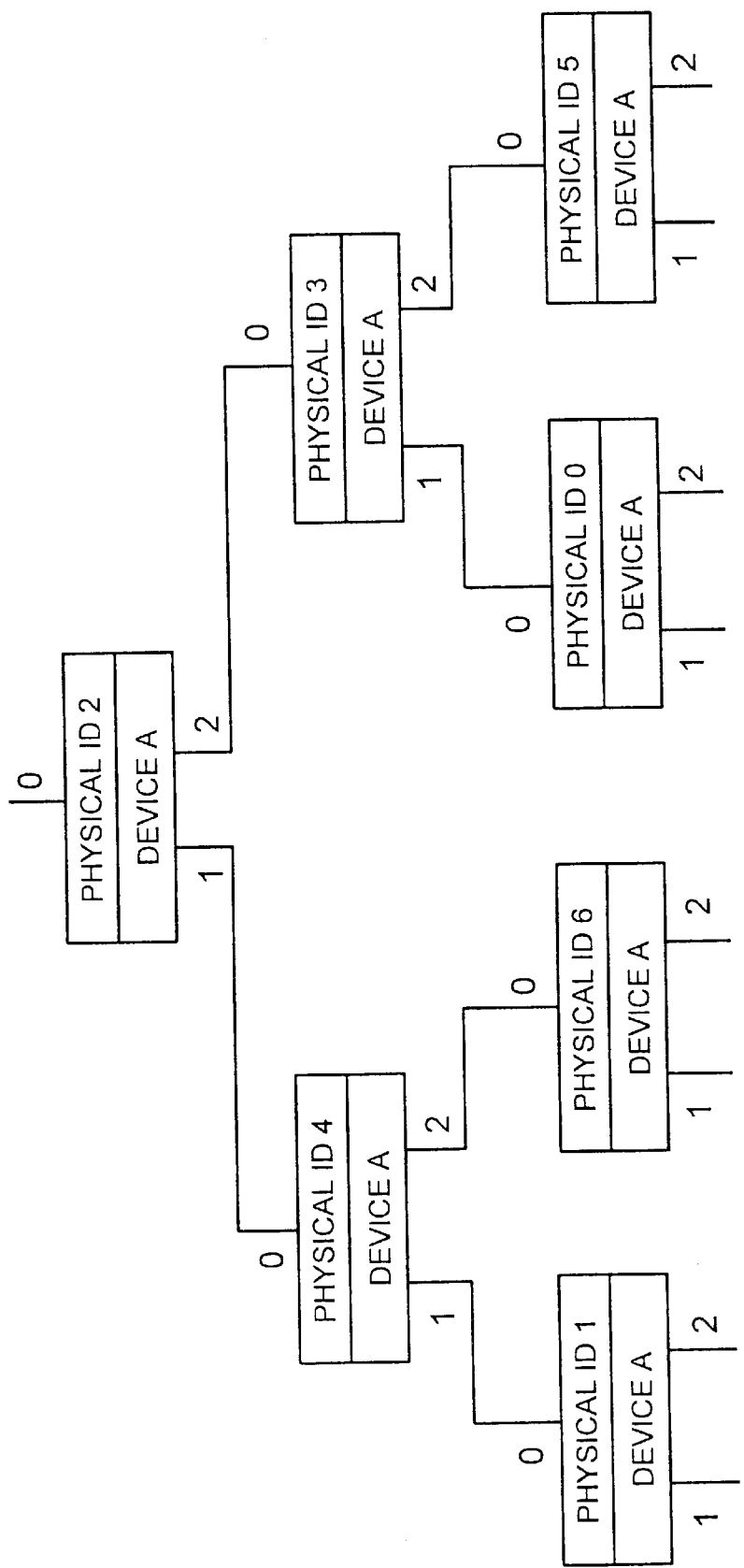
FIG. 1 is a block diagram showing a typical IEEE 1394 network topology in which the present invention may be used when devices connected thereto include Internet Protocol suite applications.

FIG. 1 is a block diagram showing a typical IEEE 1394 network in which the present invention may be used when devices connected thereto include Internet Protocol suite applications. Each of the devices connected to the network is assigned a dynamically variable physical ID in accordance with IEEE 1394 protocol, but includes applications from the Internet Protocol suite which are configured for operation in a IP network environment which is a fixed logical address based network.

Figure 1A:
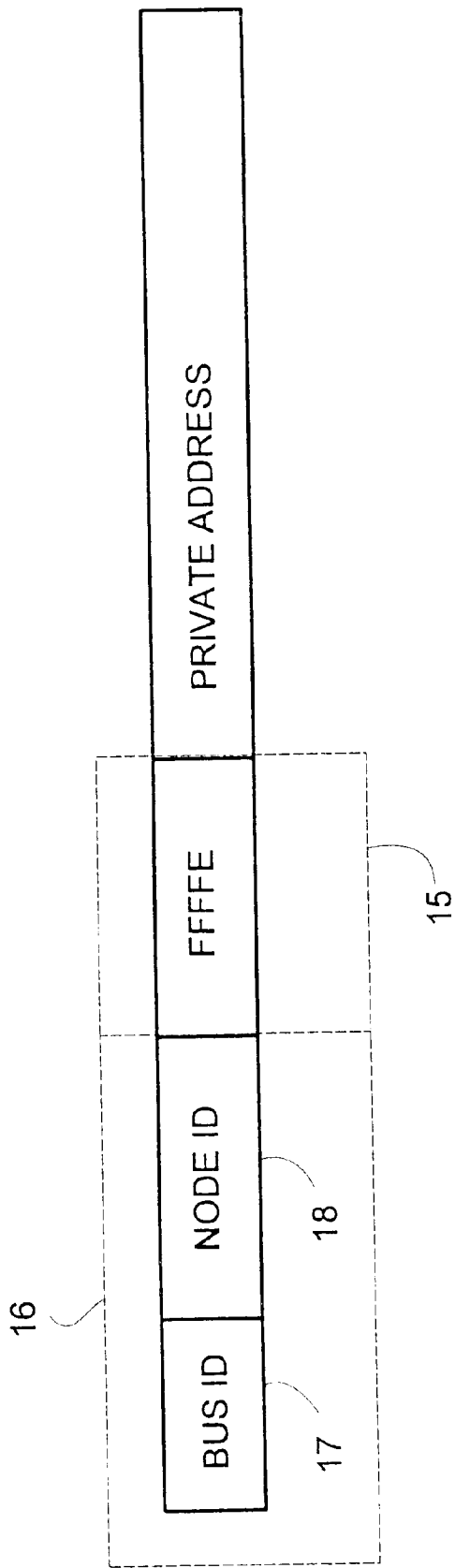
FIG. 1(A) is a diagram showing the conventional address structure used for the IEEE 1394 serial bus.

FIG. 1(A) illustrates the conventional IEEE 1394 scheme for addressing nodes. As shown therein, the upper bits of each address represent the node ID 16. This node ID is divided into two smaller fields: the higher order bits 17 specify the bus ID and the lower order bits 18 specify the physical ID as shown. In the address example shown, the address is designated to be of the "private" type (in accordance with IEEE 1394 protocol) by setting certain bits in the private space portion 15 of the address as shown. The various address types available are well known to those familiar with the IEEE 1394 standard. The private address space is reserved for node local uses.

Figure 2:
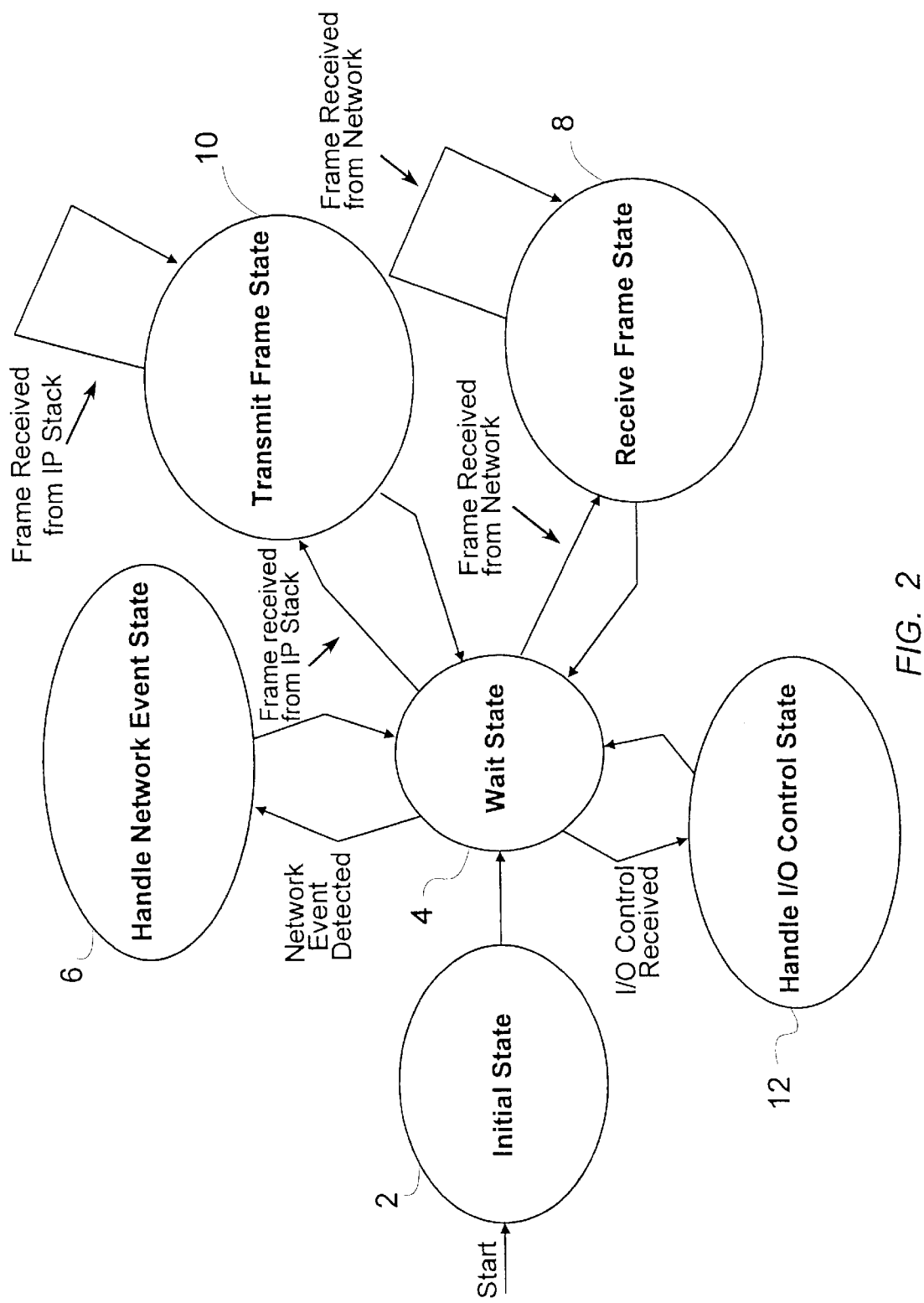
FIG. 2 is an internet protocol interface state transition diagram for the invention.
Figure 3:
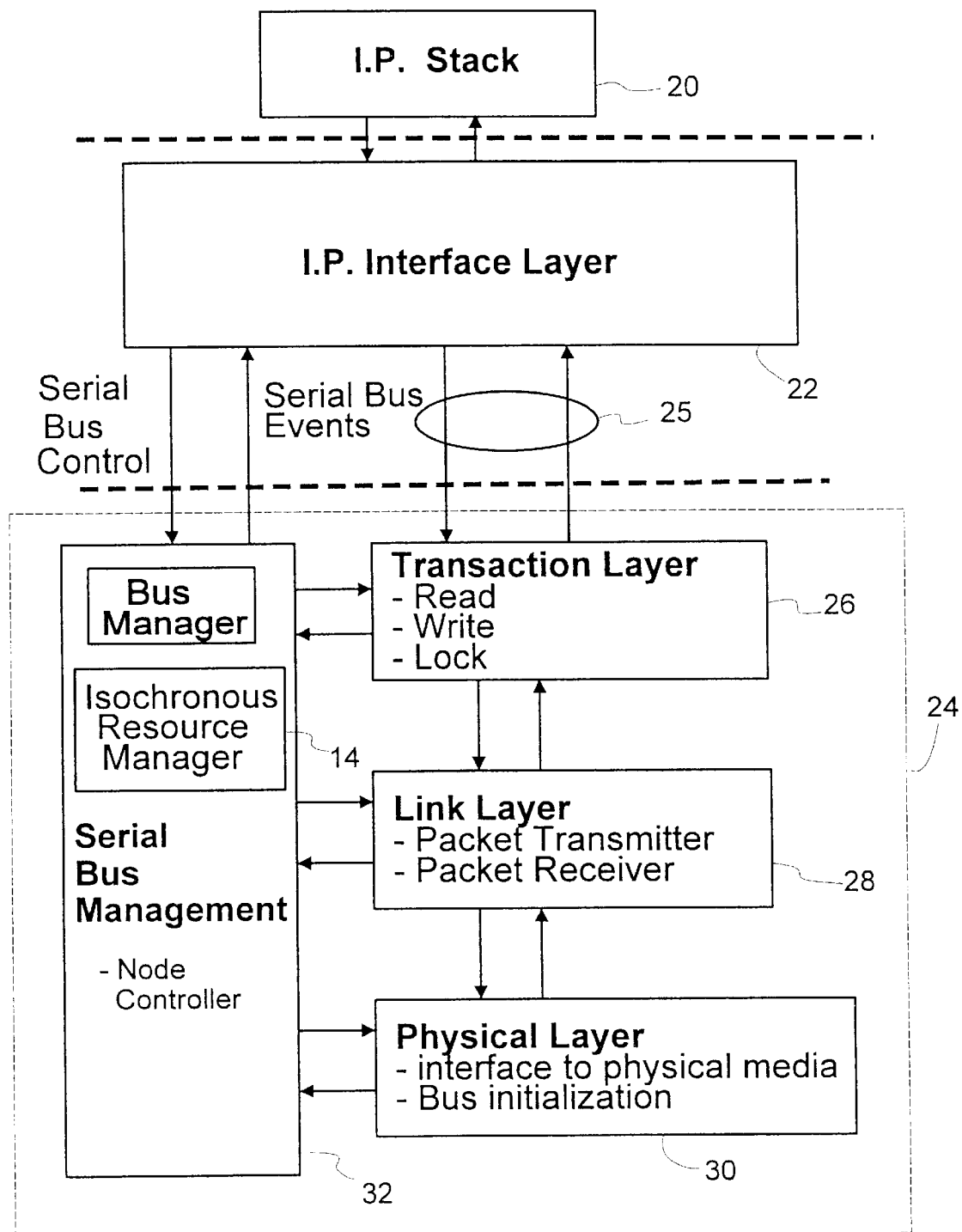
FIG. 3 is a block diagram showing the internet protocol interface stack of the invention.

FIG. 2 is a state transition diagram for an IEEE 1394/Internet Protocol Interface for permitting applications from the Internet Protocol suite to operate in an IEEE 1394 network environment. FIG. 3 is a block diagram showing an overall network system architecture, including a conventional Internet Protocol ("IP") suite stack 20, the Internet Protocol ("IP") interface layer 22 according to the invention, and the conventional standard IEEE-1394 protocol layers 24. In accordance with the present invention, the architecture of FIGS. 2 and 3 can be independently implemented in each of the one or more computer based network devices shown in FIG. 1.

As shown in FIG. 3, the IP stack 20 is comprised of the various IP applications contained in the internet, transport and application layers of the IP suite. The applications may include, but are not limited to, any of a variety of well known facilities including TELNET, FTP, NFS, RPC, Apps, Sockets, UDP, TCP, IP, ICMP and BootP. These applications use the IP interface layer 22 to integrate the IP protocol suite layers with the IEEE 1394 network.

The IP interface layer 22 is comprised of the software and hardware implementation that provides the capabilities to interface the IP protocol stack to an IEEE 1394 network. Other interfaces, not shown in FIG. 3, may be present at this level in support of protocols both standard and proprietary. The IP interface layer 22 communicates bi-directionally with IP stack 20 as shown. Serial bus control indications and events are communicated to the serial bus management component 32. Serial bus Write transactions 25 (read requests and indications) are communicated to the transaction layer as shown. As will be described in greater detail, the IP interface layer 22 also provides serial bus control and is notified of serial bus events via the serial bus management node 32. Serial bus data transactions occur via communications between the interface layer 22 and the IEEE 1394 transaction layer 26. Such transactions can typically include Read, Write and Lock requests in accordance with the IEEE 1394 specification.

Finally, FIG. 3 also illustrates the architectural relationship between the conventional IEEE 1394 Transaction Layer 26, Link Layer 28, Physical Layer 30 and Serial Bus Management block 32. These elements are realized with a combination of hardware and software. However, all such elements concern a generic implementation of the IEEE-1394 specification.

Figure 4:
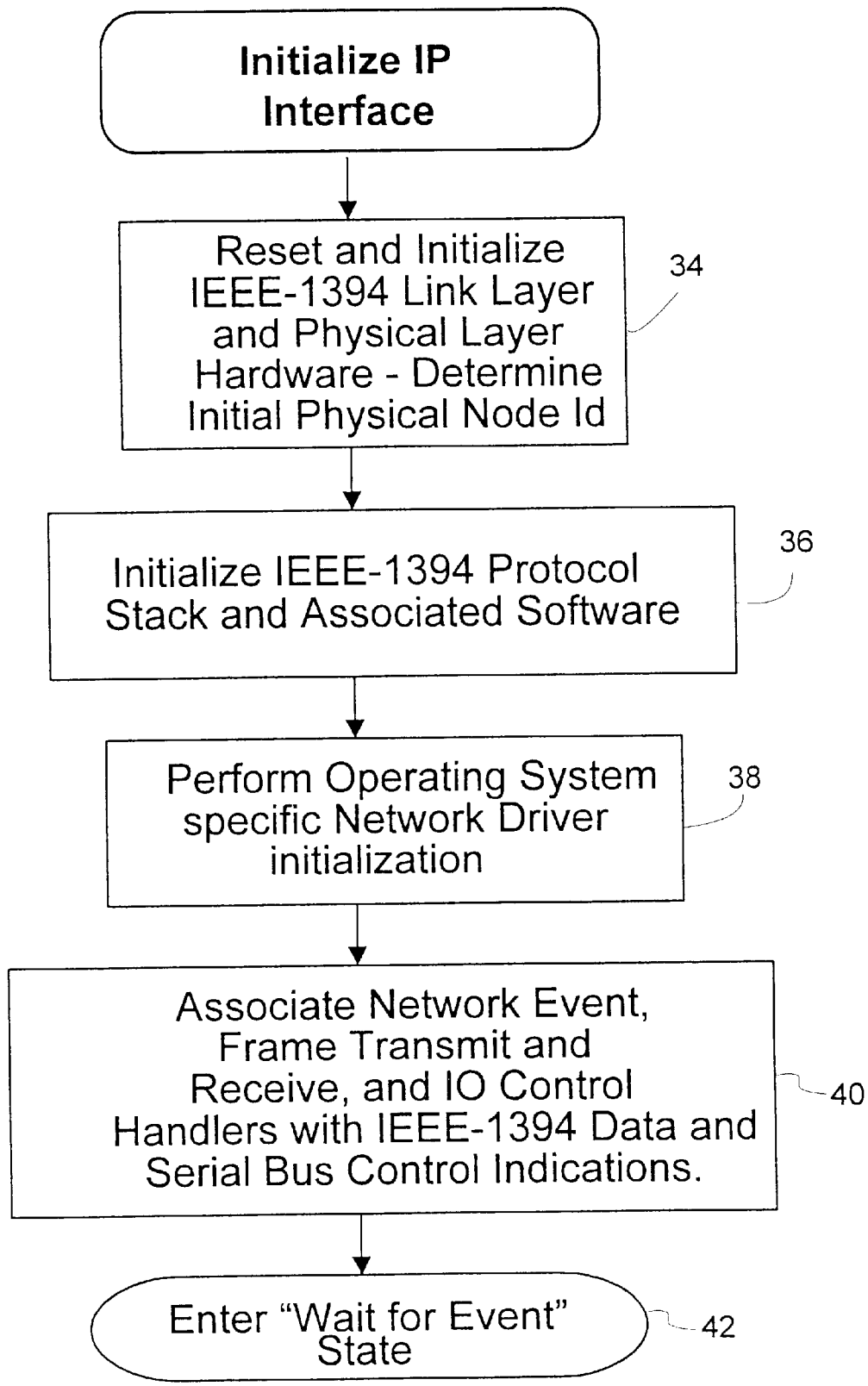
FIG. 4 is a flow chart showing the initialization process for the internet protocol interface of FIGS. 1 and 2.

As shown in FIG. 2, the internet protocol interface includes an initial state 2 during which the interface performs certain system initialization tasks as shall be hereinafter described in greater detail relative to FIG. 4. The initialization state begins in step 34 with a reset and initialization of the hardware used to implement the IEEE-1394 Link Layer 28 and Physical Layer 30. This is accomplished by conventional means as will be readily appreciated by those familiar with the IEEE 1394 specification and hardware. As part of this initialization process, a bus reset event will be generated on the network which will cause the dynamic reassignment of physical addresses to each of the network nodes in accordance with the conventional IEEE 1394 specification. This dynamic reassignment will also result in an assignment of an initial physical address to the particular network device on which the stack in FIG. 3 has been implemented. In step 36, the IEEE 1394 protocol stack software is initiated. In step 38 in FIG. 4, the IP interface layer 22 performs operating system specific network driver initialization using methods and procedures which will be readily appreciated by those skilled in the art.

In a preferred embodiment according to the invention, it may be desirable for the interface layer 22 to emulate to the IP stack 20 an Ethernet type network which uses a standard 48 bit address (as compared to 16 bits for IEEE 1394). In that case, it is desirable when initializing the ARP utility to provide a physical address for the interface which corresponds to the standard 48 bit Ethernet addressing scheme. This can be accomplished by appending an additional 32 bits to the address as part of step 38. The additional 32 bits are preferably added as least significant bits to the initial physical node identifier assigned by the IEEE 1394 network. These bits may be either a random selection or, in a preferred embodiment, may encode additional information about the particular network device. Subsequently, when ARP requests are received from other network devices, the complete 48 bit simulated Ethernet address will be provided to them. Thus, at least to the ARP utilities in each IP stack, the network will appear to have all the address characteristics of an Ethernet type network.

In step 40, IP interface layer 22 associates network event, frame transmit and receive, and I/O Control handler software (as described below relative to FIGS. 4–8) with IEEE 1394 data and serial bus control indications. These steps involve standard programming procedures for registering functions as being available to handle network events or "indications" generated by the lower layers in the stack. Upon completion of these initialization steps in FIG. 4, the IP interface layer 22 transitions in step 42 enters an event wait state 4, as shown in the FIG. 2 state transition diagram.

Figure 5:
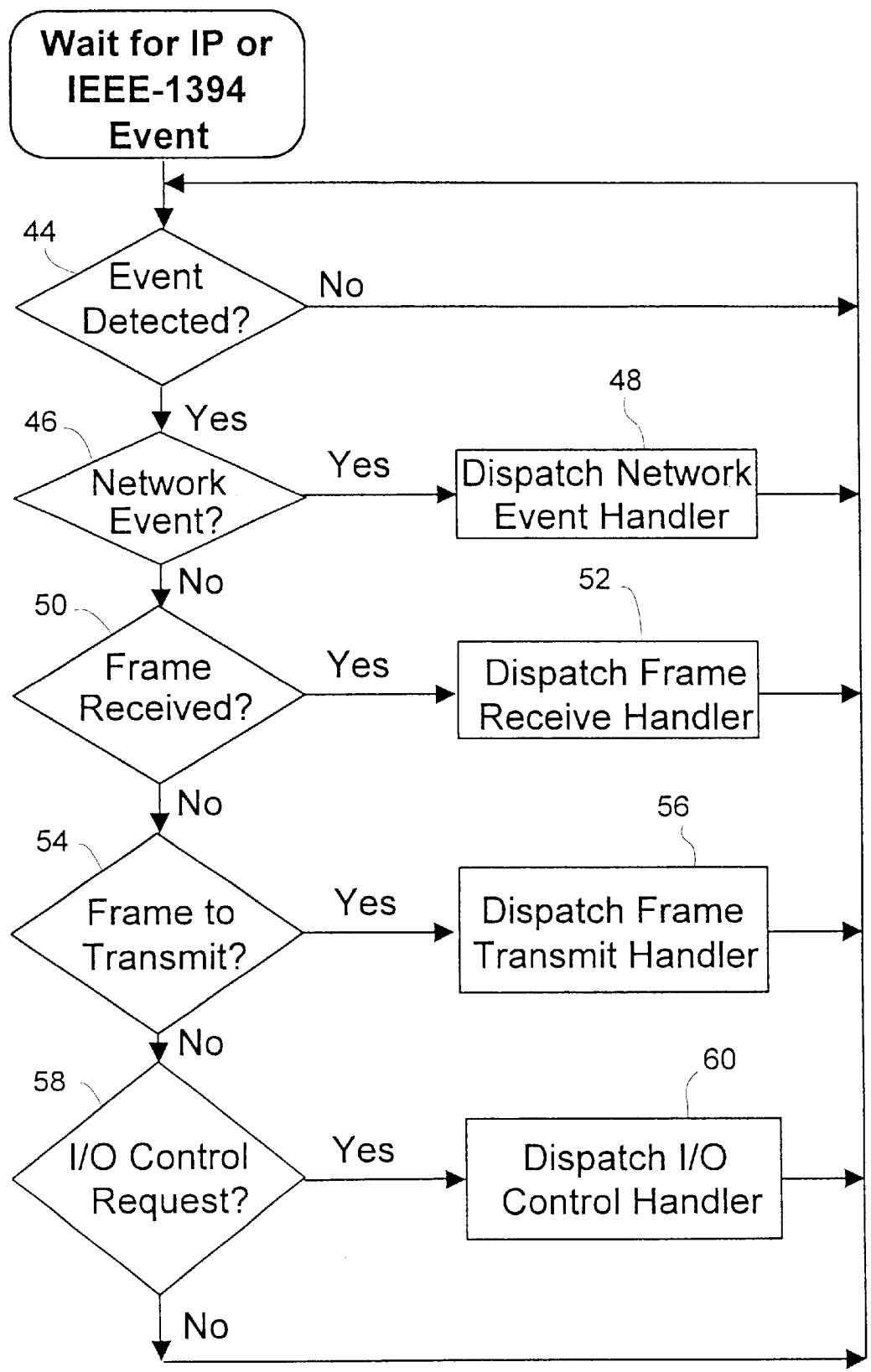
FIG. 5 is a flow chart showing the steps associated with the wait state for the internet protocol interface of FIGS. 1 and 2.

The process associated with the wait state 4 is shown in flowchart form in FIG. 5. As illustrated therein, the IP interface layer 22 continually monitors the IP protocol stack applications and the IEEE 1394 network in step 44 to determine whether an event has occurred which requires some action. If such an event is detected, the interface layer 22 analyzes the event in step 46 to determine whether it was a network event. A network event would typically include bus reset indication or bus error indications received from the IEEE 1394 network. However, the invention is of course not limited in this regard. If the event is one which has been pre-defined as a network event, the network event handler is dispatched in step 48 and the system transitions to the handle network event state 6 in FIG. 2. If the event was not a network event, the interface layer proceeds to step 50 to determine whether the event was a frame received event, meaning that a frame of data was received from the IEEE 1394 network. If so, the IP interface 22 dispatches the frame receive handler in step 52 and the IP interface transitions to the receive frame state 8 in FIG. 2. If the event is not a frame received event, the IP interface proceeds to step 54. In step 54 the IP interface determines whether the event detected was a frame to transmit event. A frame to transmit event occurs when a frame of data is received from one of the applications in the IP stack. If the event is determined to be a frame to transmit event, the IP interface dispatches the frame transmit handler in step 56 and the state transitions to the transmit frame state 10 in FIG. 2. Finally, if the event detected is not a frame to transmit, the IP interface checks in step 58 to determine whether the detected event is an I/O control request. An I/O control request would include, for example, a request to the IEEE 1394 for an address assignment, interface flag or isochronous resource. If it is such a request, the IP interface dispatches the I/O control handler and the system transitions to the handle I/O control state 12 in FIG. 2. The processes associated with the various event states 6, 8, 10, 12 shall now be described in greater detail.

Figure 6:
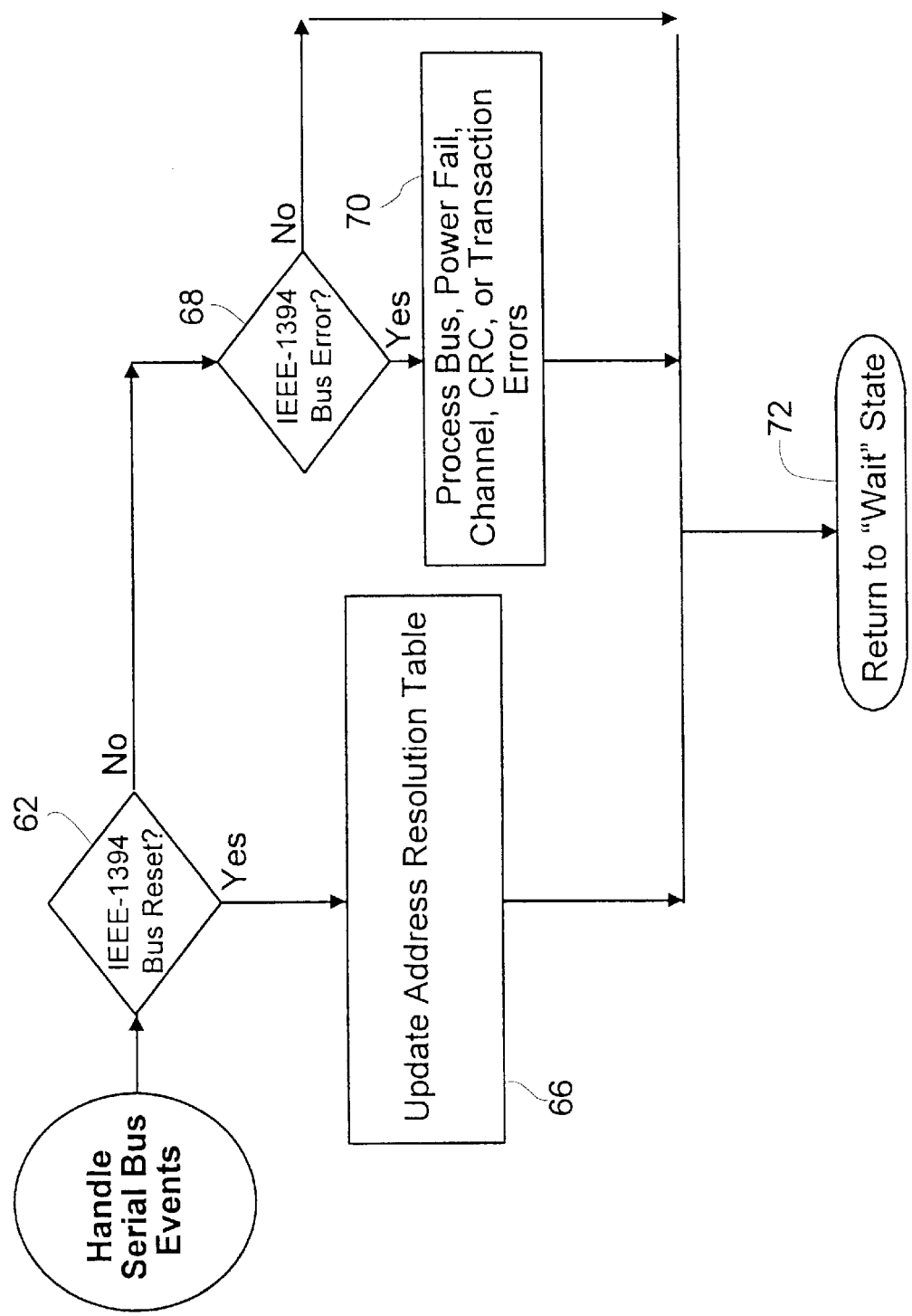
FIG. 6 is a flow chart showing the steps associated with the handle network event state for the internet interface protocol interface of FIGS. 1 and 2.

FIG. 6 illustrates the various steps associated with the handle network event state 6 previously described in relation to FIG. 2. As shown therein, the IP interface 22 begins by analyzing the network event indication in step 62 to determine if it is a bus reset event. A bus reset event will occur on the IEEE 1394 network whenever a device is connected or disconnected to the network. This can include the case where a device is logged on or off the network, or when the device is powered on or off. Such events are of particular concern to the IP interface 22 in that they may result in each device on the network being assigned a new physical address in a process by which each network device is given an opportunity to identify itself to a management node attached to the network. Accordingly, if a bus reset event indication is received, the interface performs processing necessary to assemble an updated ARP table in step 66.

FIG. 6(A) is an example of an ARP table for the network in FIG. 1. The address resolution table provides a mapping between the logical IP address needed by the IP protocol and the hardware physical addresses needed to transmit packets to specific nodes. There are two possible processes by which the ARP table can be updated with the reassigned physical address data.

In some instances, the particular ARP software entity implementation in the IP protocol stack will not permit software in the IP interface 22 to freely access the contents of the ARP table. Usually, however, such implementations do permit the entire table to be deleted by external software. Accordingly, one approach for updating the IP table is for the IP interface to cause the entire table to be deleted upon receipt of the bus reset indication from the IEEE 1394 network. In this case, the table will be regenerated over time using standard ARP procedures. This approach only requires the ability to delete all entries from an ARP table. However, it has a drawback to the extent that deleting the entire ARP table will generally result in subsequent messages being automatically discarded until the table is reconstructed. This can be an undesirable approach in certain instances.

An alternative approach is possible if individual entries contained in the ARP table are available for reading. This approach may be preferable to the first in instances where message lose cannot be tolerated or it is desirable to localize ARP processing to times in which re-configuration operations are occurring such as are typical in embedded real-time systems. In this second approach, entries in the table are processed whenever a node detects an IEEE-1394 Bus Reset as follows:

The ARP table will be scanned by IP interface 22 and each entry will be processed by extracting its IP address, generating an ARP request packet with this IP address and broadcasting the resulting ARP request on the 1394 bus. Each node on the bus with an active IP layer will receive this ARP request but only the node (if any) with a matching IP address with respond. This node will respond directly to the requestor with its IP and (new) physical address with a standard ARP response. This response will then be processed by the standard ARP handler as described in RFC 826 (it will replace any existing entry with the same IP address or create a new entry if one does not already exist). When the foregoing process is complete, the IP interface 22 returns in step 72 to the wait state 4 in FIG. 2.

In FIG. 6, if the serial bus event is not a bus reset type event, the event is further processed in step 68 to determine whether the event indicates an IEEE 1394 network error. Such error indications can include Bus, Power Fail, Channel, CRC and Transaction type errors. In the case where such error indication is received, the interface processes the indication as necessary for a particular application. The errors may be noted as statistics or some corrective action may be initiated if appropriate. Finally, when the error indication processing in step 70 is completed, the IP interface 22 returns in step 72 to the wait state 4 which is shown in FIG. 2.

Figure 7:
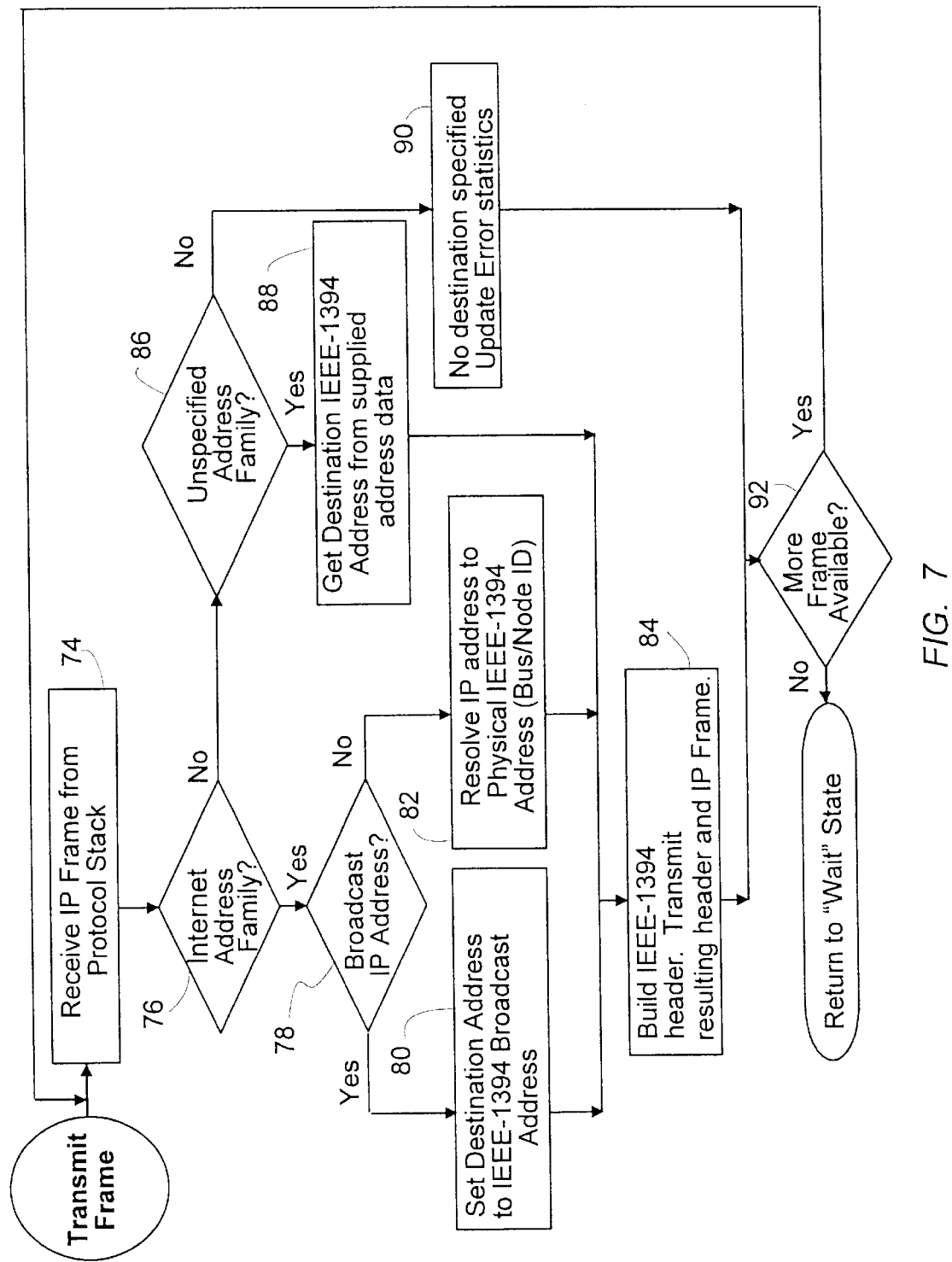
FIG. 7 is a flow chart showing the steps associated with the transmit frame state for the internet protocol interface of FIGS. 1 and 2.

FIG. 7 illustrates the various steps associated with the transmit frame state 10 previously described in relation to FIG. 2. As shown therein, the IP interface 22 receives in step 74 an IP frame or data packet from the IP stack 20. As is conventional in the case of IP data packets, the frame includes a field which designates the Internet Protocol message type. A determination is made in step 76 as to whether the destination address information for the frame indicates that is within the internet address family as opposed to some other type of address. This indicates that the address being received is a proper internet address. If the address is part of the internet address family, the IP interface 22 proceeds in step 78 to determine whether the address is a broadcast type Internet Protocol address, indicating that the frame is to be sent to all devices on the network. If so, the IP interface 22 sets the destination address in step 80 to a corresponding type IEEE 1394 broadcast address which is defined by the IEEE 1394 specification.

Subsequently, in step 84, the interface 22 assembles a header in conformance with IEEE 1394 network specifications. In constructing the address portion of the header, the interface inserts the necessary code to designate the message as being of the "private" type, thereby creating a private address space as shown in FIG. 1(A), which is reserved for node-local uses. In the present case, internet protocol message type information is inserted in the private address space so that the node on the receiving end will be provided with this information. Finally the assembled data packet and header are transmitted to the transaction layer 26 for transmission across the network. For the purpose of simply transmitting the message, an IEEE 1394 Asynchronous Block Write packet is used. However, it will be readily appreciated by those skilled in the art that the interface could be configured for building Read or Lock type packets as well. The type of packet which is required to be assembled by the interface will depend upon the particular application task at hand. For the purposes of implementing the IP protocol stack as described herein, the IEEE 1394 Asynchronous Block Write packet is preferably used.

If in step 78 a determination is made that the address is not a broadcast IP address, then the specific address of the device must be determined in order to assemble the IEEE 1394 header. This is accomplished in step 82 wherein the logical internet IP address is mapped to the physical IEEE 1394 address using the ARP table assembled as previously discussed relative to FIG. 6.

As noted above, it may be desirable for the interface 22 to cause a 48 bit simulated Ethernet address (16 bits IEEE 1394 plus 32 bits of random or encoded data) to be stored in the ARP table. In such instances, an additional process is performed in step 82, namely the stripping from the retrieved ARP address of the 32 bits of non-IEEE 1394 address information. The remaining 16 bits are the physical address which are used in step 84 to form the IEEE 1394 physical address. Once the physical address information is retrieved from the ARP table, the interface 22 proceeds as previously described to step 84 to assemble the appropriate IEEE 1394 header using the IEEE 1394 physical address. Once again, the address fields are set to indicate a private type message and the Internet Protocol type is encoded in the private address field. In step 92 the interface determines whether additional frames are available or have been received from the IP stack and if so, returns to step 74.

Specific IP stack applications which are developed may be configured with the capability of providing proper IEEE 1394 device addresses (i.e., the physical address) directly to the interface 22. In that event, the IP interface 22 would determine in step 76 that the address provided is not an internet family address. In step 86, a determination is then made as to whether the IP frame contains an unspecified family address. If so, then the IP interface 22 recognizes the frame as already having an IEEE 1394 type address and retrieves the address in step 88. This address information is then used in step 84 to assemble the information needed for a proper IEEE 1394 packet header, which information is then transmitted to the IEEE 1394 transaction layer 26 so that the packet may be transmitted across the network.

Figure 8:
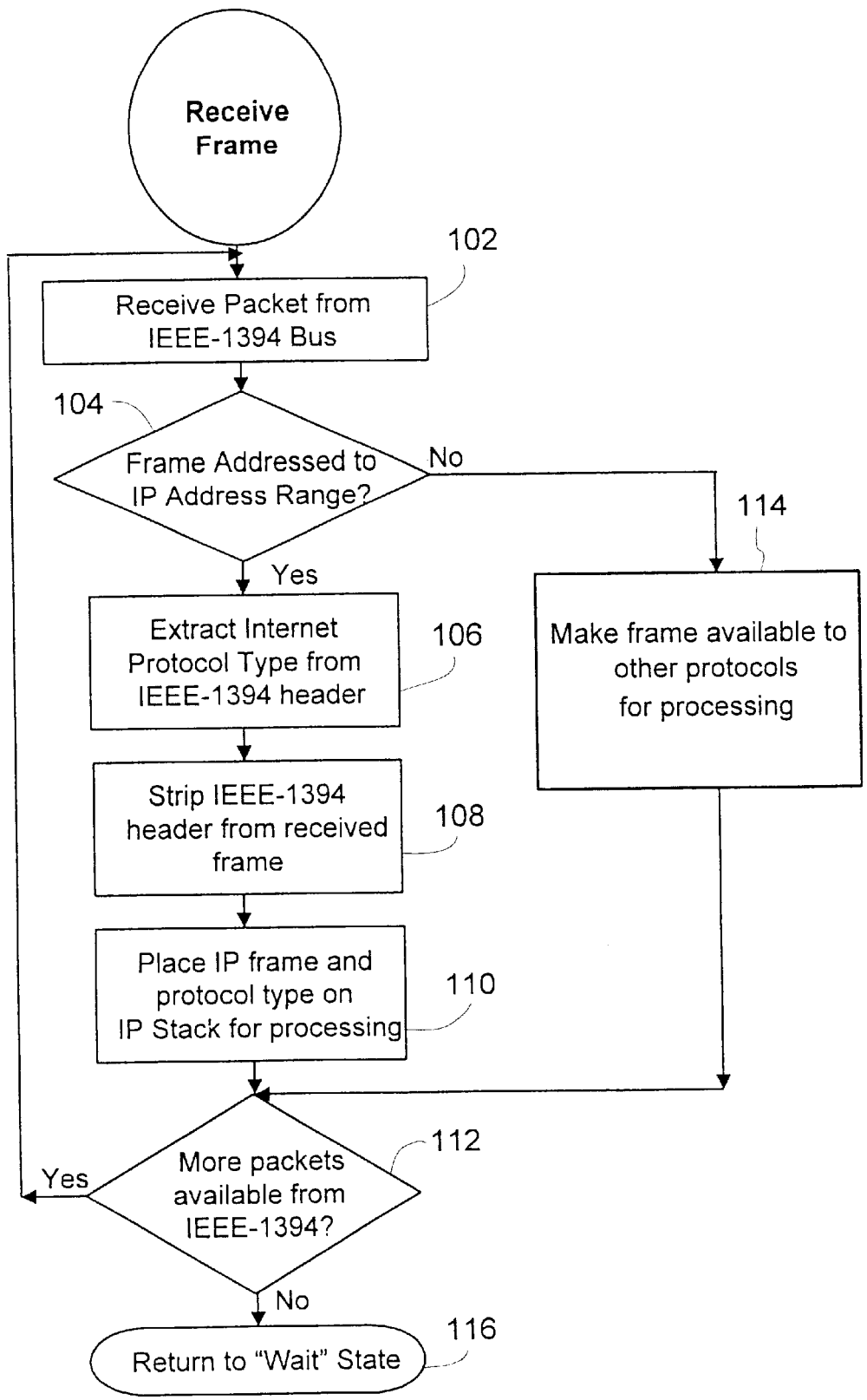
FIG. 8 is a flow chart showing the steps associated with the receive frame state for the internet protocol interface of FIGS. 1 and 2.

FIG. 8 illustrates the various steps associated with the receive frame state 8 previously described in relation to FIG. 2. As shown therein, the data packet is received by the IP interface layer 22 in step 102 and is subsequently analyzed in step 104 to determine whether the data packet or frame contains an address which is within the IP address range. If not, the frame is made available to other protocols for processing in step 114. If, however, the frame does have an address within the IP address range, the IP interface proceeds in step 106 to extract the "private" address field data from the IEEE 1394 header (see FIG. 1(A)) to determine the internet protocol type which is encoded therein by the transmitting device. As previously described relative to FIG. 7, this internet protocol type data is encoded at transmission time as part of the private IEEE 1394 address space when the header is created.

In step 108, The IEEE 1394 header data is stripped from the received frame or data packet. The IP frame and protocol type are then placed on the IP stack for processing. In step 112, the IP interface checks to see if more packets of data are available from the IEEE 1394 network. If so, it returns to step 102 to continue processing the data packets. If no additional data packets are available, the interface returns to the wait state 4 in FIG. 2.

Figure 9:
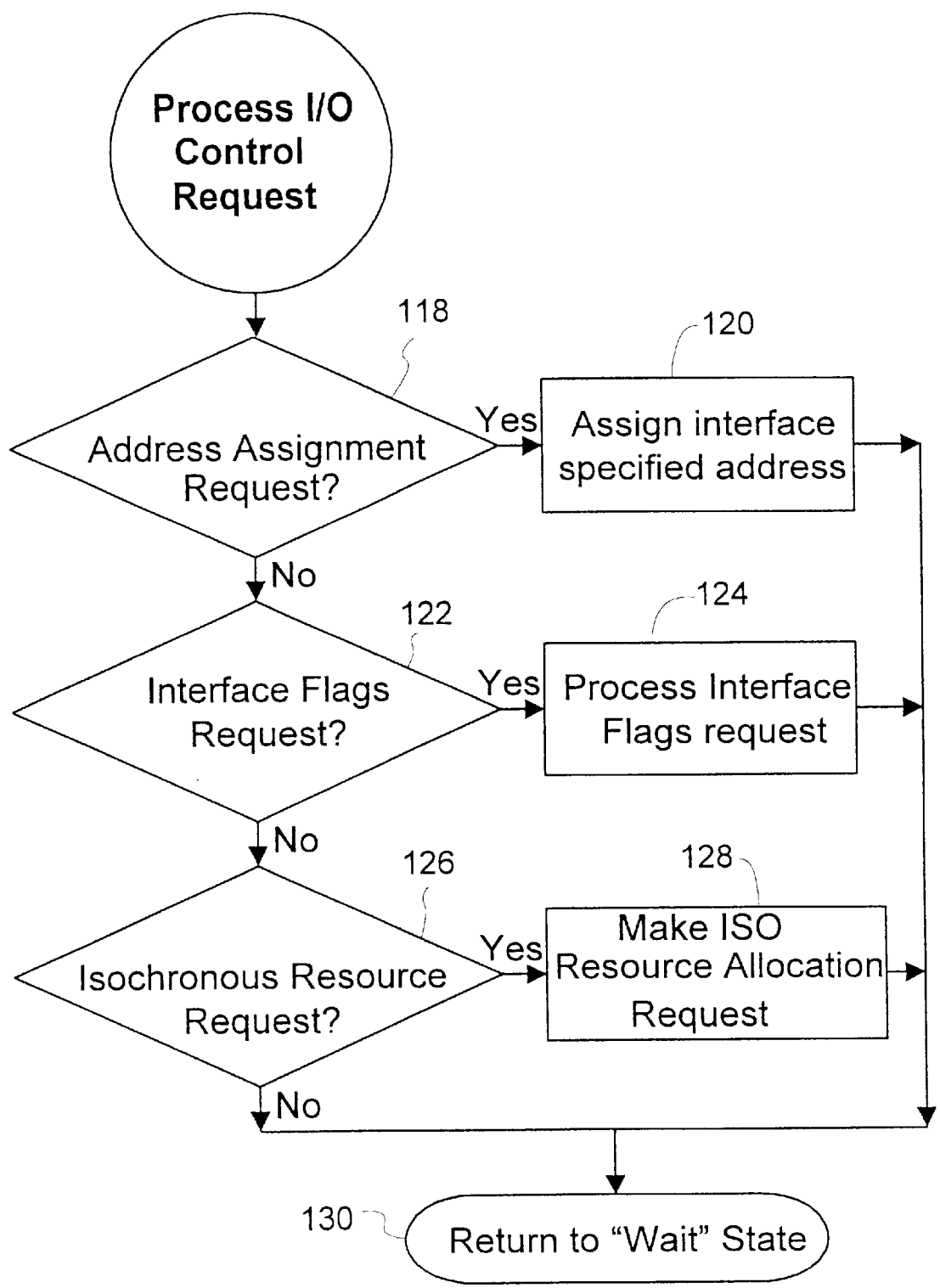
FIG. 9 is a flow chart showing the steps associated with the I/O control state for the internet protocol interface of FIGS. 1 and 2.

FIG. 9 illustrates the various steps associated with the handle I/O control state 12 as previously described in relation to FIG. 2. As shown therein, when the IP interface receives an I/O control request from the IP stack 20, it first attempts to determine the request type. Steps 118 and 122 concern conventional IP suite I/O control requests which are handled by the IP interface 22. If the particular application in the IP stack is configured for operation with the IEEE 1394 network standard, it is possible that the control request may be one which seeks to use the isochronous transmission option offered by such network. When such a request is detected, the IP interface 22 will initiate the conventional IEEE 1394 messaging necessary to request guaranteed bandwidth from the isochronous resource manager 14. The isochronous resource manager would assign a channel number (0 to 63) and the channel number will be stored by the IP interface 22 for use in subsequent isochronous data transmissions.

Figure 10:
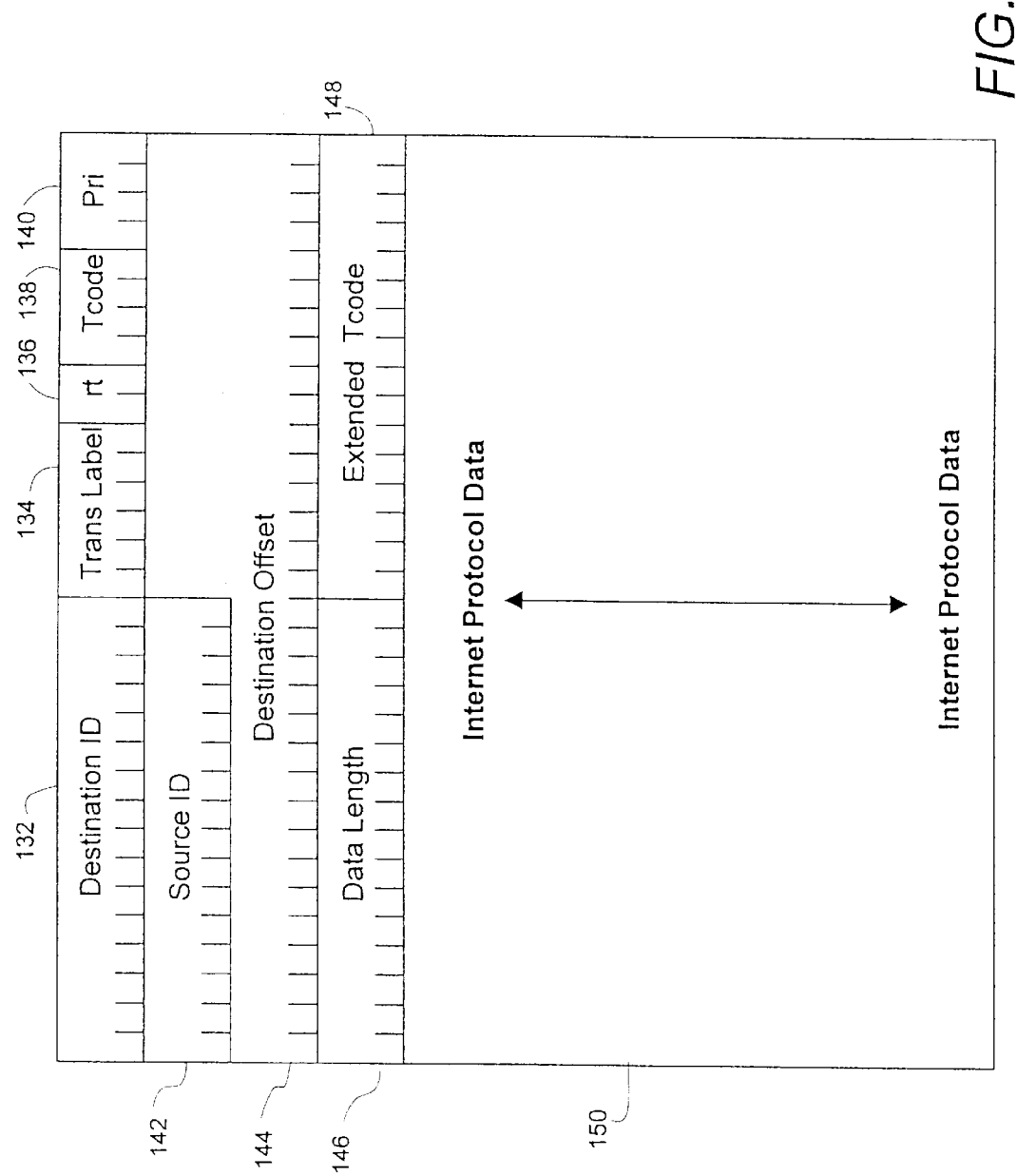
FIG. 10 is a block diagram of an IEEE 1394 type asynchronous write request for block packet data used to transmit Internet Protocol data in the present invention.

FIG. 10 is a diagram which illustrates the format of an IEEE 1394 asynchronous write request for block data packet which is preferably used to transmit Internet Protocol data in the present invention. The destination ID 132 is set to the physical address of the destination node (Bus ID/Node ID) or the broadcast address of Bus ID/Node ID=63. This field defines the first 16 bits for the 64 bit Serial Bus Address space. The transaction label 134 is set to a sequence number by the IEEE 1394 Transaction Layer and is not significant to the process as described herein. Retry (rt) code 136 is set by the lower layers of the IEEE 1394 protocol and is also not otherwise significant for the purposes of the present invention. In a preferred embodiment of the invention as described herein, the Transaction Code 138 is set to Asynchronous Write Request for block data. Priority code 140 is typically set to zero and is not otherwise significant. The Source ID block 142 is set to the physical address of the node originating the data packet.

The Destination Offset 144 specifies the least significant 48 bits of the 64 bit serial bus address space. For the purposes of the present invention, this field is set to 0xFF_FFE0_pppp, where "pppp" is the protocol type (i.e., 0x0888 for IP, 0x806 for ARP). Data length is set to the length in bytes of the Internet Protocol Data contained in the data section 150 of the packet shown. It should be noted that the Internet Protocol Data in FIG. 10 is the IP data supplied by the IP stack to be transmitted or the received data that is to be supplied to the IP stack. Finally, the extended Tcode field 148 is, for the purposes of the present application, set to 0 and not used for this type of packet.

I claim:

1. A method for hosting a logical address based network protocol suite on a high speed serial bus network which has operatively connected thereto a plurality of network devices, each defining a node with a dynamically variable physical address, said method comprising:

storing in said devices a physical address together with a corresponding device logical address in an address resolution protocol (ARP) table, said ARP table providing a mapping between said physical addresses and said logical addresses;

monitoring said network to identify the occurrence of a bus reset event which has the potential to change a physical address assigned to said nodes;

updating said ARP table upon the occurrence of said bus reset event; and accessing said ARP table upon receipt of a data packet to be transmitted on said network to determine an updated physical address for a device on said network based upon said logical address.

2. The method according to claim 1 wherein said physical addresses are processed before being stored in said ARP table to append additional bits as compared to the number of bits comprising the physical addresses of said high speed serial bus network.

3. The method according to claim 1 wherein said ARP table is maintained by said logical address based network protocol suite, said logical address based network protocol suite is configured to operate with a conventional network wherein said physical addresses are comprised of additional bits as compared to the physical addresses of said high speed serial bus network, said method further comprising the steps of:

forming a simulated address by appending least significant bits to said serial bus network physical address so that its total address length is equivalent to addresses used in said conventional network;

providing said simulated address to said ARP table.

4. The method according to claim 1 wherein said ARP table is maintained by said logical address based network protocol suite.

5. The method according to claim 1 wherein said step of updating said ARP table is performed by deleting existing data contained in said ARP table and permitting said ARP table to regenerate itself.

6. The method according to claim 1 wherein said step of updating said ARP table is performed by the additional steps of:

processing said ARP table by extracting each said logical address contained therein;

generating a network request for each said logical address, said network request containing said logical address, and is broadcast to said plurality of devices on said network to obtain a response from said device with a matching logical address which identifies a new physical address; and processing each said response to extract said new physical address and replacing each of said physical addresses with said new physical address corresponding to said logical address.

7. The method according to claim 6 wherein said ARP table is maintained by said logical address based network protocol suite, said logical address based network protocol suite is configured to operate with a conventional network wherein said physical addresses are comprised of additional bits as compared to the physical addresses of said high speed serial bus network, said method further comprising the steps of:

forming a simulated address by appending least significant bits to said serial bus network physical address so that its total address length is equivalent to addresses used in said conventional network;

providing said simulated address to said ARP table.

8. The method according to claim 1 further comprising the step of:

receiving a data packet from an application program executing on a first one of said devices configured with logical address based network protocol, said data packet addressed to a second one of said network devices;

analyzing said data packet address to determine if said data packet is intended for an application associated with said logical address based network protocol suite;

accessing said ARP table to obtain said physical address for said second device based upon said logical address;

assembling a frame header for said data packet, said frame header including an address field;

processing said address field to insert said physical address in said address field; and transmitting said data packet via said network for receipt by said second device identified by said physical address.

9. The method according to claim 8 wherein said ARP table contains simulated physical addresses to which additional least significant bits have been added, further comprising the step of stripping said least significant bits from said simulated physical address prior to inserting said physical address in said address field.

10. The method according to claim 1 further comprising the steps of:
   receiving a data packet from said network, said data packet comprising a network information header containing a data packet address;
   extracting from said data packet address a message type, said message type identifying a specific logical address based network protocol application for which said message is intended;
   processing said data packet to remove said network information header from said data packet; and
   placing said data packet and said message type on a stack comprising said logical address based network protocol suite for further processing.

11. The method according to claim 1 wherein said logical address based network protocol suite is an internet protocol suite.

12. The method according to claim 1 wherein said high speed serial bus network is configured in accordance with the IEEE-1394 high speed serial bus standard.

13. The method according to claim 1 wherein an indication of said bus reset event is generated by an occurrence selected from the group consisting of adding a node and removal of a node from the network.

14. A programmable computer interface system for hosting a logical address based network protocol suite on a high speed serial bus network which has operatively connected thereto a plurality of network devices, each defining a node with a dynamically variable physical address, said computer interface system comprising:
   means for storing in said devices a physical address together with a corresponding device logical address in an address resolution protocol (ARP) table, said ARP table providing a mapping between said physical addresses and said logical addresses;
   monitoring means for monitoring said network to identify the occurrence of a bus reset event which has the potential to change a physical address assigned to said nodes;
   means for updating said ARP table upon the occurrence of said bus reset event; and
   means for accessing said ARP table upon receipt of a data packet to be transmitted on said network to determine an updated physical address for a device on said network based upon said logical address.

15. The programmable computer interface system according to claim 14 further comprising means for processing said physical addresses before said addresses are stored in said ARP table, to append additional bits as compared to the number of bits comprising the physical addresses of said high speed serial bus network.

16. The programmable computer interface system according to claim 14 wherein said means for updating said ARP table is an application comprising said logical address based network protocol suite, and said logical address based network protocol suite is configured to operate with a conventional network wherein said physical addresses are comprised of additional bits as compared to the physical addresses of said high speed serial bus network.

17. The programmable computer interface system according to claim 16 further comprising:
   means for forming a simulated address by appending least significant bits to said serial bus network physical address so that its total address length is equivalent to addresses used in said conventional network; and
   means for providing said simulated address to said ARP table.

18. The programmable computer interface system according to claim 14 wherein said means for updating said ARP table is an application comprising said logical address based network protocol suite.

19. The programmable computer interface system according to claim 14 wherein said means for updating said ARP table deletes existing data contained in said ARP table and causes said ARP table to regenerate itself.

20. The programmable computer interface system according to claim 14 wherein said means for updating said ARP table is comprised of:
   means for extracting from said ARP table each said logical address contained therein;
   means for generating a broadcast network request for each said logical address, said network request containing said logical address;
   means for receiving a response from said device with a matching logical address which identifies a new physical address; and
   means for extracting from each said response said new physical address and replacing each of said physical addresses with said new physical address corresponding to said logical address.

21. The programmable computer interface system according to claim 14 wherein said ARP table is maintained by said logical address based network protocol suite, said logical address based network protocol suite is configured to operate with a conventional network wherein said physical addresses are comprised of additional bits as compared to the physical addresses of said high speed serial bus network, further comprising:
   means for forming a simulated address by appending least significant bits to said serial bus network physical address so that its total address length is equivalent to addresses used in said conventional network; and p1 means for providing said simulated address to said ARP table.

22. The programmable computer interface system according to claim 14 further comprising:
   means for receiving a data packet from an application program executing on a first one of said devices configured with logical address based network protocol, said data packet addressed to a second one of said network devices;
   means for analyzing said data packet address to determine if said data packet is intended for an application associated with said logical address based network protocol suite;
   means for accessing said ARP table to obtain said physical address for said second device based upon said logical address;
   means for assembling a frame header for said data packet, said frame header including an address field;
   processing means for inserting into said address field said physical address; and,
   means for transmitting said data via said network for receipt by said second device identified by said physical address.

23. The programmable computer interface system according to claim 22 wherein said ARP table contains simulated physical addresses to which additional least significant bits have been added, further comprising:
   means for stripping said least significant bits from said simulated physical address prior to inserting said physical address in said address field.

24. The programmable computer interface system according to claim 14 further comprising:
   means for receiving a data packet from said network, said data packet comprising a network information header containing a data packet address;
   means for extracting from said data packet address a message type, said message type identifying a specific logical address based network protocol application for which said message is intended;
   processing means for removing from said data packet said network information header; and
   means for placing said data packet and said message type on a stack comprising said logical address based network protocol suite for further processing.

25. The programmable computer interface system according to claim 14 wherein said logical address based network protocol suite is an internet protocol suite.

26. The programmable computer interface system according to claim 14 wherein said high speed serial bus network is configured in accordance with the IEEE-1394 high speed serial bus standard.

27. The programmable computer interface system according to claim 14 wherein an indication of said bus reset event is generated by an occurrence selected from the group consisting of adding a node and removal of a node from the network.

28. A method for hosting a logical address based network protocol suite on a high speed serial bus network which has operatively connected thereto a plurality of network devices, each defining a node with a dynamically variable physical address, said method comprising:
   storing in said devices a physical address together with a corresponding device logical address in an address resolution table, said address resolution table providing a mapping between said physical addresses and said logical addresses;
   monitoring said network to identify the occurrence of a bus reset event which has the potential to change a physical address assigned to said nodes;
   updating said address resolution table upon the occurrence of said bus reset event, said updating step comprising the steps of processing said address resolution table by extracting each said logical address contained therein, generating a network request for each said logical address, said network request containing said logical address, and is broadcast to said plurality of devices on said network to obtain a response from said device with a matching logical address which identifies a new physical address, and processing each said response to extract said new physical address and replacing each of said physical addresses with said new physical address corresponding to said logical address; and
   accessing said address resolution table upon receipt of a data packet to be transmitted on said network to determine an updated physical address for a device on said network based upon said logical address.

29. A programmable computer interface system for hosting a logical address based network protocol suite on a high speed serial bus network which has operatively connected thereto a plurality of network devices, each defining a node with a dynamically variable physical address, said computer interface system comprising:
   means for storing in said devices a physical address together with a corresponding device logical address in an address resolution table, said address resolution table providing a mapping between said physical addresses and said logical addresses;
   monitoring means for monitoring said network to identify the occurrence of a bus reset event which has the potential to change a physical address assigned to said nodes;
   means for updating said address resolution table upon the occurrence of said bus reset event, said updating means comprising processing means for extracting from said address resolution table each said logical address contained therein, means for generating a broadcast network request for each said logical address, said network request containing said logical address, means for receiving a response from said device with a matching logical address which identifies a new physical address, and processing means for extracting from each said response said new physical address and replacing each of said physical addresses with said new physical address corresponding to said logical address; and
   means for accessing said address resolution table upon receipt of a data packet to be transmitted on said network to determine an updated physical address for a device on said network based upon said logical address.

* * * * *